July 15, 1958 H. H. HOWE 2,843,171
TUBELESS TIRE AND WHEEL COMBINATION
Filed Feb. 21, 1955 4 Sheets-Sheet 1

INVENTOR.
HAROLD H. HOWE
BY Chapin & Neal
ATTORNEYS

INVENTOR.
HAROLD H. HOWE
BY Chapin & Neal
ATTORNEYS

July 15, 1958     H. H. HOWE     2,843,171

TUBELESS TIRE AND WHEEL COMBINATION

Filed Feb. 21, 1955     4 Sheets-Sheet 3

*INVENTOR.*
HAROLD H. HOWE
BY *Chapin & Neal*

ATTORNEYS

July 15, 1958 H. H. HOWE 2,843,171
TUBELESS TIRE AND WHEEL COMBINATION
Filed Feb. 21, 1955 4 Sheets-Sheet 4

INVENTOR.
HAROLD H. HOWE
BY
Chapin & Neal
ATTORNEYS

2,843,171

TUBELESS TIRE AND WHEEL COMBINATION

Harold H. Howe, Brooklyn, N. Y.

Application February 21, 1955, Serial No. 489,403

7 Claims. (Cl. 152—9)

This invention relates to a tubeless pneumatic tire and wheel combination affording resilient tractive support for automobiles, trailers and other vehicles.

The pneumatic tire has been an essential factor in the development of the automotive transportation. A basic rule in pneumatic support is that a given amount of air is required to support a given load. Such amount of air confined in a flexible container at low pressure absorbs shocks from irregularities in the surface traveled much more effectively than when confined in a smaller container at higher pressure and the trend since the introduction of the early automobiles has been toward larger tires at lower pressures.

The general object of the present invention is to further decrease the pressure of the supporting air by increasing the capacity of the container without disturbing the accepted overall diameter. This will result in less jarring reaction to irregularities in the surface traveled. In general this is achieved by including within the air container, space heretofore occupied by the hub and spokes of the conventional wheel, the conventional hub and spokes being replaced by a disc which directly supports the inner bead of the tire element and in part forms one wall of the air chamber and by tension members connected to an outer disc spaced from the hub disc and connected thereto by the tension members, the periphery of the outer disc being either permanently or releasably connected to the outer bead of the tire element.

With the trend toward larger section, low pressure tires, the wheel rim diameter has been decreased to the point where braking efficiency becomes impaired, the small brake diameter required to keep inside the tire rim, reducing both the braking area and the lever arm on which it is applied. It is a further object of the invention to remove this restriction and permit larger brake diameters at the same time that an increase in volume of the air container is secured.

The smaller rim diameters necessary in the conventional low pressure tire and resulting in taller flexible tire sections introduced instability with respect to side motion which has had to be overcome by spreading the beads on a wider rim base and this decrease in bead diameter has reduced the contact area between the tire and rim and consequently the area for transversion of the driving force. It is a further object of the present invention to provide a structure which permits a return to a larger rim diameter in relation to the total height and the elimination of a natural reverse curve in the flexible section supported on the rim, thereby securing stability with respect to side motion without undue spreading of the beads, and increasing the contact area for transmission of the driving force while increasing the volume of the air chamber. A further object is to decrease the serious hazard now prevailing at sudden deflation of the tire. The present small diameter rims drop the axle 6" to 8". With the larger rim diameter of this invention, the axle drop on sudden deflation of the tire is only 3" or 4", restoring a semblance of car control while stopping.

A further object is to secure an overall wheel flexibility by elimination of the rigid conventional hub and spoke wheel structure.

A further object is to secure maximum pneumatic support for a vehicle and in a manner adaptable to various conditions of operation on different types of vehicles.

Other and further objects and advantages residing in the details of construction, will be made apparent in the disclosure of the accompanying drawings and in the following specification and claims.

Referring to the drawings.

Figure 1:
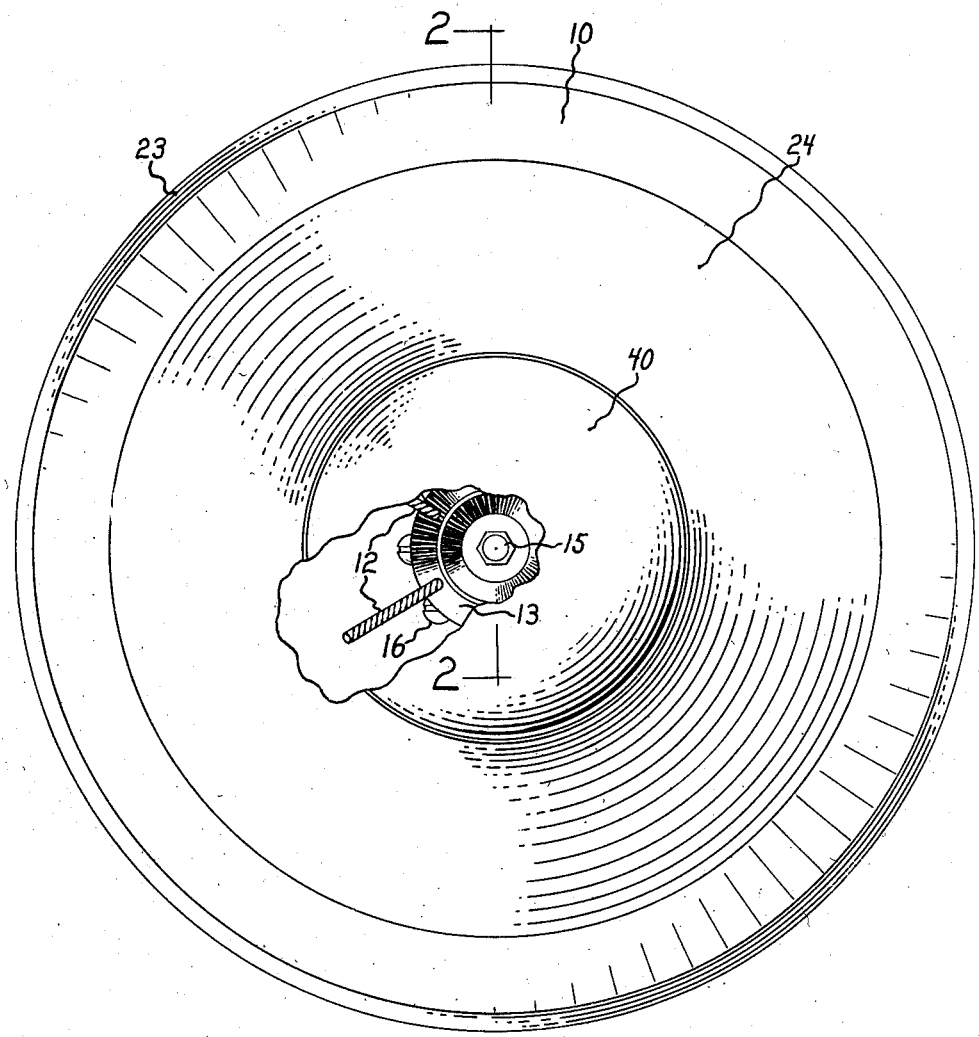
Fig. 1 is an elevational view of the outer side of a tire and wheel combination embodying the invention, parts being broken away.
Figure 2:
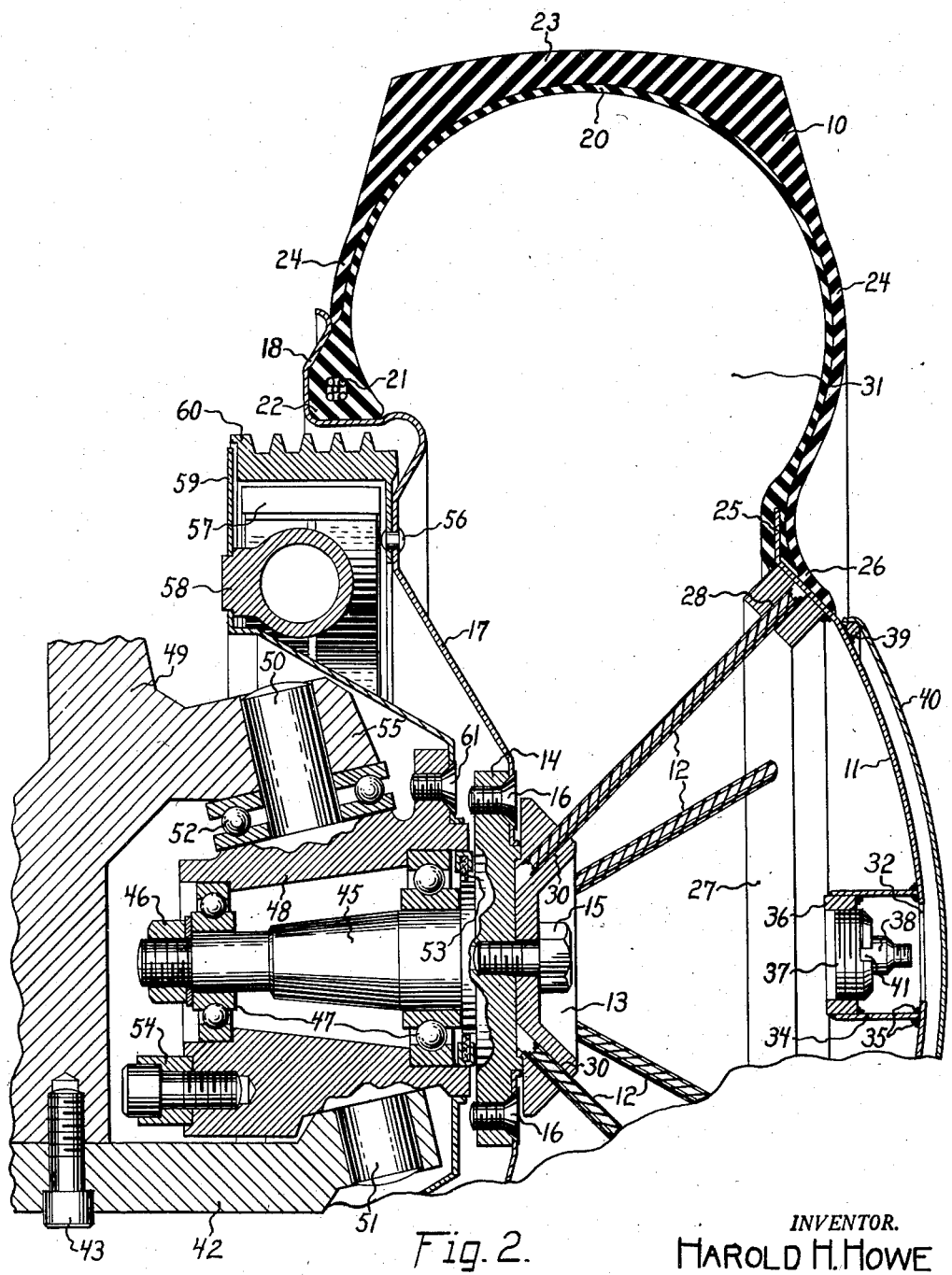
Fig. 2 is a sectional view on a larger scale, substantially on line 2—2 of Fig. 1.

Referring to Figs. 1 and 2 the wheel is shown as comprising an annular tire element generally indicated at 10, an outer wall disc, generally indicated at 11 which is connected by circumferentially spaced, flexible substantially inextensible cables 12 to a plate or disc 13. Disc 13 is releasably secured to a hub disc 14, forming part of the vehicle hub assembly, by a tap bolt 15. Secured to disc 14, by tap bolts 16, is an inner annular disc member 17 which with disc 13 forms the inner wall of the air chamber. Member 17 is provided around its outer periphery with a seat 18. As shown in Fig. 2 member 17 is of a diameter and is so shaped that seat 18 surrounds the periphery of the adjacent brake drum 60 later described.

The tire element 10 as shown in Fig. 2 may be constructed in general in accordance with tubeless tire practice and comprises a carcass 20 formed of a plurality of plies of rubberized cords, not individually shown. As will be understood, the number and arrangement of the plies will depend on the load to be supported and the overall diameter of the tire and wheel desired, and that suitable cord angles will be employed and that the various tire elements such as chafer, cushion and breaker strips will be incorporated to give the desired graduated and balanced flexibility in the side walls from the bead portions through the tread shoulders, in accordance with known tire building technology. One edge of the plies are locked around an inextensible bead core 21 of metal wire in the usual manner to form a "bead" 22 which engages in seat 18 in the same manner that the beads of a conventional tubeless tire engages the similar seats in the rim of the wheels on which they are mounted. The carcass 20 is covered over its peripheral surface with a body of rubber compound to form the tread portion 23 of the tire element which contacts the road surface, the tread having side portions 24 which extend over the side walls of the carcass 20 to protect the latter against the usual service hazards. The tire element 20 as shown in Fig. 2 differs from the conventional casing or tire in that the edge of the carcass 20 and side wall 24 opposite the bead 22 are permanently secured by conventional vulcanizing and known bonding methods directly to the peripheral edge portion 25 of the wall disc 11, the adjacent side wall portion 24 being preferably extended over and secured to the adjacent portion of the disc as indicated at 26. The interior of the flexible area of the tire element subject to puncture may be coated with a self-sealing material in the usual manner to prevent punctures from allowing deflation.

The disc 11, which is preferably curved or cupped outwardly as shown, is provided on its inner surface with a ring member 27 welded to the disc. Ring 27 is formed with a plurality of spaced openings or sockets 28 in which the outer ends of the cables 12 are respectively welded or otherwise secured. The inner ends of cables 12 of which there are three or more (six being indicated) are welded or otherwise secured in openings or sockets 30 formed in disc 13.

As will be apparent from Fig. 2, when bead 22 is seated in air-tight relation in seat 18 and disc 13 is bolted to disc 14 an air chamber 31 is formed which is commensurate with the entire diameter of the wheel. The length of cables 12 are such as to normally hold the disc 11 in a position concentric with the hub disc 14 when the wheel is inflated, the curvature of disc 11 and the angularity of openings 28 and 30 being such that when the elements are at rest and the wheel unloaded the cables 12 are under uniform straight line tension and the tire element is held completely symmetrical around the center of rotation.

The disc 11 is provided with a central opening 32 of a diameter to give adequate access to bolt 15 for purposes of attachment and removal of disc 13 from hub 14 in the mounting and demounting of the air wheel. A cylindrical member 34 is welded as at 35 to the inner face of disc 11 adjacent the edge of opening 32. An annular ring 36 is welded to the inner edge portion of member 34, the inner periphery of ring 36 being threaded to receive a threaded plug 37 which carries a suitable inflation valve 38. Disc 11 is provided with a snap ring 39 which releasably secures a decorative "hub cap" 40 which closes opening 32.

As will be apparent upon removal of cap 40 access is had to valve 38 through which compressed air may be introduced into chamber 31 to inflate the wheel to the proper pressure for carrying the weight and load of the vehicle, and that upon removal of plug 37, which is provided with suitable grooves or lugs 41 to facilitate removal, access is had to bolt 15.

It should be further noted that with the valve in the center, the complete assembly is in mechanical balance about the center of rotation.

In Fig. 2 the invention is shown as applied to a front wheel of an automobile. The hub disc 14, on which disc 13 is mounted is integral with wheel spindle 45 which is rotatably held as at 46 in bearings 47 interposed between the spindle 45 and hub 48, a conventional packing element 53 being interposed between the end of the bearing and disc 14. Hub 48 is swiveled in the front axle 49 by upper and lower trunnion or king pins 50 and 51 respectively, a thrust bearing 52 being positioned between the upper arm 55 of the axle and hub 48 and the latter is shown connected to the usual steering arm or link 54. The lower trunnion 51 of the hub 48 is held in position by a removable lower arm 42 affixed to the axle 49 by stud bolt 43. The brake drum 60 is secured by rivets, one of which is shown at 56, to the wheel member 17, the brake shoes being indicated at 57 with their hydraulic operating cylinders indicated at 58. The brake drums, shoes and cylinders with their operating parts, not shown, may be of conventional construction but as later pointed out may be larger in braking area and effectiveness than is permitted by conventional low pressure tire practice. Brake shoes 57 and the cylinders 58 are carried by a brake shoe backing plate 59 secured to hub 48 by tap bolts, one of which is shown at 61.

While the wheel hub arrangement described shows some proportional changes over conventional hub design in order to give a maximum of space in the air chamber, the chamber forming structure shown could be applied to the presently used hub designs with only slight reduction in the air space gained and can of course equally well be applied to a rear axle.

Figure 3:
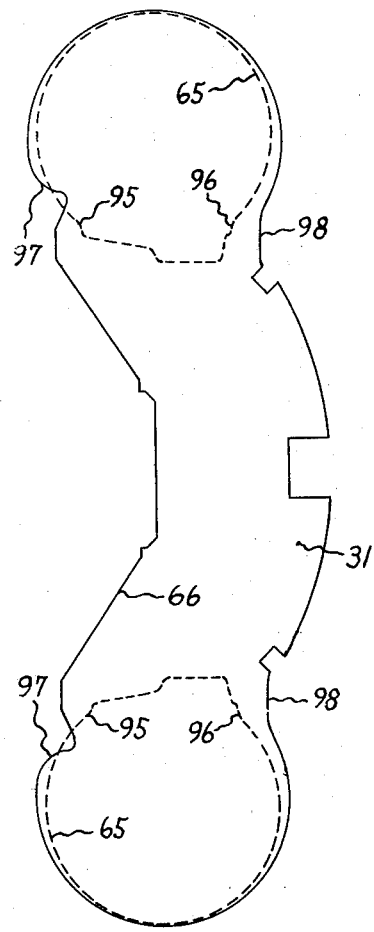
Fig. 3 is a diagrammatic view comparing in sectional outline the air capacity secured by the invention with that of a comparable conventional type.

In Fig. 3 the air capacity secured by the invention is compared with that of a comparable conventional tire. In Fig. 3 the air chamber afforded by a conventional tire of 30" outside diameter is shown in section by dotted lines at 65 while the corresponding section of the air chamber 31 afforded by the invention for a wheel of similar outside diameter is indicated in full lines at 66. For the 30" conventional tire the air capacity is approximately 2495 cubic inches whereas the corresponding capacity secured by the invention is approximately 3880 cubic inches, a gain or increase of substantially 55 percent.

Figure 4:
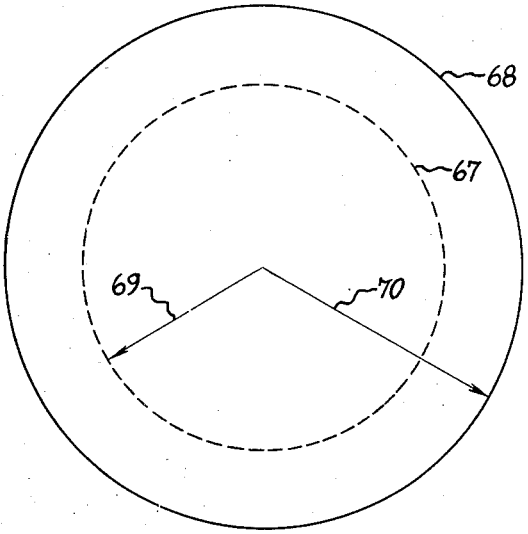
Fig. 4 is a similar view making a like comparison with respect to brake efficiency.

In Fig. 4 the circumference of the braking surface permitted by the conventional tire of 30" outside diameter is shown in dotted lines at 67 in comparison with the circumference of the braking surface, indicated in full lines at 68, made available by the invention for an outside tire diameter of 30". For the conventional tire a brake diameter of approximately 11" is permitted whereas the diameter afforded by the invention approximates 16", an increase of substantially 45 percent without widening the drum and brake band. Furthermore, the mechanical advantage gained, as represented by the respective radii 69 and 70, yields a further increase in braking efficiency of approximately an additional 45 percent.

Figure 5:
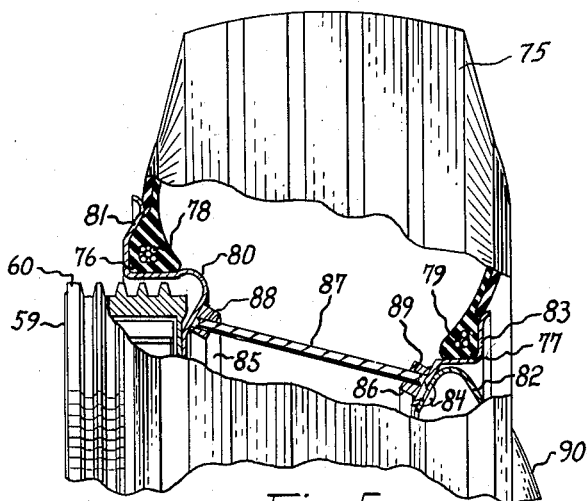
Fig. 5 is a fragmentary peripheral elevational view, parts being broken away and showing an alternative cable arrangement.

Fig. 5 shows a modified embodiment of the invention. In the modification of Fig. 5 the tire element 75 is built and cured with two bead portions 76 and 77 with respective inextensible bead cores 78 and 79, the outer bead 77 being of less diameter than inner bead 76. The inner wheel disc 80 is similar in form and equivalent in function to member 17 previously described and is provided with a seat 81, for the reception of bead 76, similar in all respects to the seat 18 of member 17. Disc member 82, which corresponds to member 11 of Fig. 2 is provided with an annular seat member 83, riveted as at 84 to disc 82, for the reception of outer baad 77.

The detachable disc 13 of Fig. 2 is replaced in the embodiment of Fig. 5 by an annular ring 85 welded to member 80 adjacent seat 81. A ring 86 similar to ring 27, except for position, is welded to seat member 83. Rings 85 and 86 are connected by three or more cables, one of which is shown at 87, the ends of the cables being welded in opposed opening 88 and 89 formed in the respective rings 85 and 86. As will be understood cables 87 serve the same purpose and function as cables 12 previously described, and as here used, illustrates an opposite inclination in which they may be employed, converging toward the outer disc rather than diverging as in Fig. 2.

Member 82 is provided with a cap 90, similar in all respects to cap 40 of Fig. 2 and with a similar inflation valve, not shown in Fig. 5.

In the form of the invention shown in Fig. 5, disc 82, the parts carried thereby and cables 87 become a permanent part of the vehicle wheel assembly. In mounting the tire element 75 the bead 76 passes freely over the disc 82 and its seat 83, while bead 77 is distorted to an oval form for passage over the rim to its seat 83 in the manner common in conventional tire mounting.

As will be apparent both forms above described provide an air chamber substantially commensurate with the wheel dimensions, in other words, the wheel elements are all pneumatically supported with the exception of the inner wall or wheel disc (17 or 80). The inclination of the cables, whether the cables are positioned as in Fig. 2 or Fig. 5, tend to maintain the outer discs (11 or 82) substantially concentric with the wheel axis but permits limited turning or displacement of the outer discs relative to the inner discs against the pressure in the air chamber, under varying traction strains.

Referring again to Fig. 3 the position of the inner bead or rim of the conventional low pressure tire is indicated at 95 and the position of the outer bead or rim of the conventional low pressure tire is indicated at 96. The inner bead or rim position of tire element of the illustrated embodiment of the present invention is indicated at 97 and the outer "bead" or "rim" location thereof at 98.

As will be apparent, the inner and outer bead diameters of the conventional tire are the same and that any increase in air volume for a given overall tire diameter can be obtained only by decreasing the bead diameter with a corresponding decrease in brake drum diameter and braking efficiency, thus air capacity under conventional practice is substantially limited by the braking requirements and is obtained at the expense of the latter. As will be equally apparent in the combination of the present invention the capacity of the air chamber is substantially constant and commensurate with the overall tire and wheel dimensions regardless of the "bead" or "rim" diameters of the tire element.

As shown in Fig. 3, the inner "rim" diameter of the tire element of the present invention, as indicated at 97, is substantially greater than the corresponding inner diameter of the conventional low pressure tire, thereby obtaining a braking efficiency heretofore obtainable only by the sacrifice of the advantages of low pressure tire operation. The outer "rim" diameter of the tire element of the present invention, as indicated at 98, may be substantially the same as that of the conventional tire, but as is apparent the inner and outer bead diameters may be located as desired to meet the braking needs and the tire carcass construction requirements without substantial change in the air capacity of the wheel and tire combination, which as above pointed out is substantially greater than is afforded by present practice.

The invention in its fullest utility affords maximum cushioning of the vehicle against road shocks, permits lower air pressures, which with the overall resiliency of the construction minimizes the chance of blow-outs and similar operational hazards, and affords maximum braking efficiency.

Figure 6:
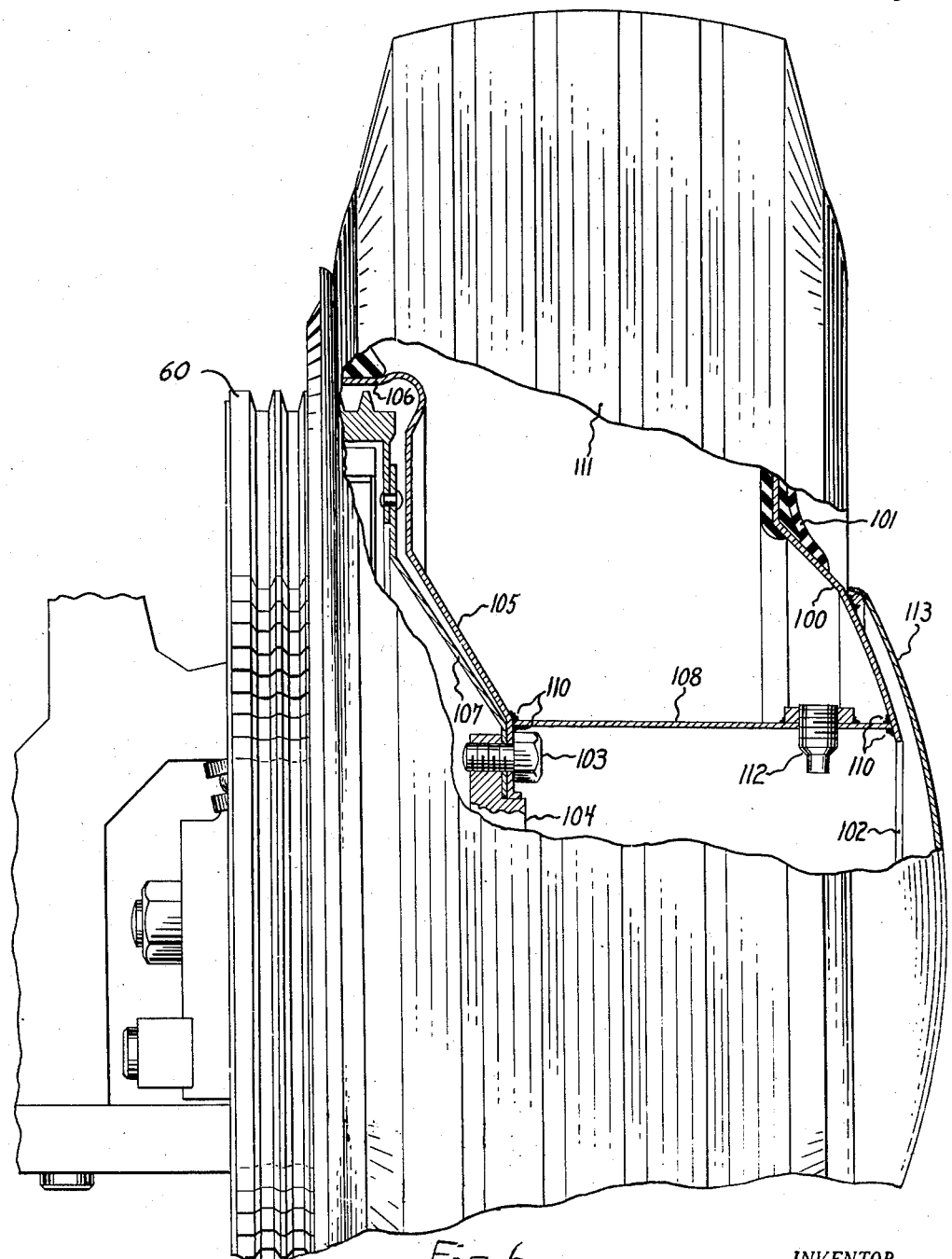
Fig. 6 is a similar view showing a modified structure taking a limited advantage of a feature of the invention.

The structures above described illustratively embody the full advantages of the present invention. However, in circumstances where the structural flexibility imparted by the cable connection of the outer and inner discs are not desired and the ability to carry a spare wheel in inflated condition is important or desirable the full advantages of the increase in brake diameter and a substantial portion of the increase in air volume afforded by the invention may be secured by the modified structure shown in Fig. 6. As shown in the latter figure the outer wall disc 100 (corresponding to disc 11 of Fig. 2), which carries the outer bead connection 101 (or a seat as at 83, Fig. 5), is provided with an opening 102 sufficiently large to give access to bolts 103 by which the wheel assembly is releasably secured to the vehicle hub 104. The inner wall disc 105, which carries the inner bead seat 106, is unconnected to the brake shoe supporting plate 107 and is connected to the outer wall disc 100 by a steel cylindrical member 108 welded at its ends, as indicated at 110 to the adjacent wall discs. The mounting bolts 103 pass through openings in inner wall disc 105 positioned within the confines of cylinder 108. Cylinder 108 rigidly connects the inner and outer wall discs and with the latter and the tire element 111 completes the air chamber. An air valve assembly 112 is welded or otherwise mounted in member 108 and is accessible for inflation or deflation of the air chamber upon removal of snap cap 113 which closes opening 102.

What is claimed is:
1. A pneumatic tire and wheel combination including a rotatable wheel axle and comprising a disc fixed to the wheel axle, the rim of said disc being formed to provide an annular seat, a second disc of less diameter than said first disc, a flexible annular tire member of tubeless construction having tread and side wall portions forming an annular chamber opening radially inwardly, the free edge of one side wall portion of the tire member being formed with an inextensible bead making a releasable but air-tight engagement with said seat, the free edge portion of the other side wall portion of the tire member being permanently secured in air-tight engagement with the periphery of said second disc, equally spaced cable members each fixed at one end to said second disc member adjacent the periphery thereof, the other ends of said cable members being fixed to a third disc of less diameter than said second disc, a bolt releasably securing said third disc to the first disc in concentric relation with the latter and the wheel axle, a countersunk opening formed in the second disc in axial alignment with and giving access to said bolt, a valve threaded in said opening, and a cap member removably secured to the outer face of the second disc member and covering said opening and said valve.

2. A pneumatic tire and wheel combination for vehicles comprising a flexible annular tire member of tubeless construction, a pair of spaced rigid discs, the edges of said discs being in air-tight engagement respectively with the head and sidewall portions of the tire member, said discs and tire member forming an air chamber, valve means for inflating and deflating the chamber, and at least three flexible cables connecting said discs and arranged as equally spaced elements of a circular right conical frustum to constrain the discs in predetermined spaced parallel, concentric relationship when said chamber of the tire and wheel combination is inflated and unloaded.

3. A pneumatic tire and wheel combination as in claim 2 in which one of said discs is of larger diameter than the other, and means securing said larger disc to the axle of the vehicle.

4. A pneumatic tire and wheel combination as in claim 3, said flexible cables being releasably connected to the larger disc.

5. A pneumatic tire and wheel combination including a rotatable wheel axle and comprising a flexible annular tire member of tubeless construction having tread and side wall portions forming an annular chamber opening radially inwardly, a rigid disc fixed to the wheel axle, a second rigid disc, the free edges of the side wall portions of the tire member being respectively connected in air-tight relation to the rims of said discs, at least three equally spaced substantially inextensible conically arranged cable members fixed at one end to said second disc adjacent the periphery thereof, the other ends of said cable members being releasably connected to said first disc in concentric relation with the latter and the wheel axle.

6. A pneumatic tire and wheel combination as in claim 5, the second disc being provided with an opening through which said releasable connection is accessible and a removable valve member closing said opening.

7. A pneumatic tire and wheel combination including a rotatable wheel axle and comprising a disc fixed to the wheel axle, the rim of said disc being formed to provide an annular seat, a second disc, a flexible annular tire member of tubeless construction having tread and side wall portions forming an annular chamber opening radially inwardly, the free edge of one side wall portion of the tire member being formed with an inextensible bead making a releasable but air-tight engagement with said seat, the free edge portion of the other side wall portion of the tire member being permanently secured in air-tight engagement with the periphery of said second disc, equally spaced cable members each fixed at one end to said second disc member adjacent the periphery thereof, the other ends of said cable members being fixed to a third disc of less diameter than said second disc, and a bolt releasably securing said third disc to the first disc in concentric relation with the latter and the wheel axle.

References Cited in the file of this patent

UNITED STATES PATENTS

| | | |
|---|---|---|
| 1,154,497 | Evans | Sept. 21, 1915 |
| 1,842,315 | Conigrave | Jan. 19, 1932 |
| 2,118,694 | Ash | May 24, 1938 |
| 2,431,897 | Wensley | Dec. 2, 1947 |
| 2,461,257 | Brandon | Feb. 8, 1949 |
| 2,709,982 | Straussler | June 7, 1955 |

FOREIGN PATENTS

| | | |
|---|---|---|
| 483,900 | Great Britain | Apr. 27, 1938 |